United States Patent
Vermeiden

(10) Patent No.: US 10,988,318 B2
(45) Date of Patent: Apr. 27, 2021

(54) CENTRIFUGAL DEWATERING CONVEYOR SYSTEM

(71) Applicant: Laitram, L.L.C., Harahan, LA (US)

(72) Inventor: Jacob Govert Vermeiden, Hasselt (NL)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 16/610,602

(22) PCT Filed: May 16, 2018

(86) PCT No.: PCT/US2018/032907
§ 371 (c)(1),
(2) Date: Nov. 4, 2019

(87) PCT Pub. No.: WO2018/213404
PCT Pub. Date: Nov. 22, 2018

(65) Prior Publication Data
US 2020/0062510 A1    Feb. 27, 2020

Related U.S. Application Data

(60) Provisional application No. 62/507,339, filed on May 17, 2017.

(51) Int. Cl.
*B65G 21/18* (2006.01)
*B65G 17/40* (2006.01)
(Continued)

(52) U.S. Cl.
CPC ............. *B65G 21/18* (2013.01); *B65G 17/36* (2013.01); *B65G 17/385* (2013.01); *B65G 17/40* (2013.01);
(Continued)

(58) Field of Classification Search
CPC .... B65G 17/066; B65G 17/086; B65G 17/36; B65G 17/385; B65G 17/40; B65G 21/18;
(Continued)

(56) References Cited

U.S. PATENT DOCUMENTS

| | | | |
|---|---|---|---|
| 3,938,651 A | 2/1976 | Allan et al. | |
| 4,944,162 A * | 7/1990 | Lang | B65G 17/062 198/831 |

(Continued)

FOREIGN PATENT DOCUMENTS

| | | |
|---|---|---|
| EP | 0333565 A1 | 9/1989 |
| FR | 1381460 A | 12/1964 |

OTHER PUBLICATIONS

Partial Supplementary European Search Report of the European Patent Office for European patent application No. EP18803096, dated Dec. 16, 2020, European Patent Office, Munich, Germany.

*Primary Examiner* — Gene O Crawford
*Assistant Examiner* — Keith R Campbell
(74) *Attorney, Agent, or Firm* — Catherine M. Bishop

(57) ABSTRACT

A centrifugal dewatering conveyor system for removing liquid from a conveyed product comprises a modular conveyor belt designed to follow a path that includes both straight portions and helical portions. The modular conveyor belt comprises a plurality of hingedly connected modules having side walls and capable of shifting laterally relative to each other and curling up about the hinge rods to form the helical portions. In the helical portions, a centrifugal force imparted on conveyed product forces water through openings in the conveyor belt.

15 Claims, 12 Drawing Sheets

(51) Int. Cl.
*B65G 17/36* (2006.01)
*B65G 33/08* (2006.01)
*B65G 17/38* (2006.01)

(52) U.S. Cl.
CPC .......... *B65G 33/08* (2013.01); *B65G 2207/24* (2013.01); *B65G 2207/30* (2013.01)

(58) Field of Classification Search
CPC   B65G 33/08; B65G 2207/24; B65G 2207/30; B04B 5/00; B04B 5/10
See application file for complete search history.

(56) References Cited

U.S. PATENT DOCUMENTS

| | | | |
|---|---|---|---|
| 5,346,057 A * | 9/1994 | Fisher | B65G 21/18 |
| | | | 198/778 |
| 5,906,270 A | 5/1999 | Faulkner | |
| 6,298,575 B1 | 10/2001 | Aikins et al. | |
| 6,681,922 B2 | 1/2004 | Corley | |
| 6,695,128 B2 * | 2/2004 | Palmaer | B65G 17/086 |
| | | | 198/778 |
| 6,811,021 B1 | 11/2004 | Corley | |
| 7,270,231 B2 * | 9/2007 | Heber | B65G 17/064 |
| | | | 198/778 |
| 7,527,146 B2 | 5/2009 | Stebnicki et al. | |
| 8,302,764 B2 | 11/2012 | Johnson | |
| 8,806,771 B2 | 8/2014 | Holmes et al. | |
| 9,161,651 B2 * | 10/2015 | Ros | A21B 1/48 |
| 2007/0084356 A1 | 4/2007 | Augusti et al. | |
| 2011/0073441 A1 | 3/2011 | Dale | |
| 2014/0021020 A1 * | 1/2014 | Bogle | B65G 15/30 |
| | | | 198/778 |

* cited by examiner

CENTRIFUGAL DEWATERING CONVEYOR SYSTEM

BACKGROUND OF THE INVENTION

The invention relates generally to power-driven conveyors and more particularly to modular conveyor belts.

Conveyor belts are widely used in various industries to convey products. Modular conveyor belts are generally constructed of a series of rows of side-by-side belt modules, which can be formed of injection molded plastic, metal or another suitable material. Hinge eyes along opposite ends of each row interleave with hinge eyes of consecutive rows. A hinge rod inserted in the interleaved hinge eyes connects the rows together at hinge joints into an endless conveyor belt loop.

In certain instances, it may be desirable to remove water or other liquid from a conveyed product. Current dewatering systems are batch operated and costly.

SUMMARY OF THE INVENTION

A centrifugal dewatering conveyor system for removing liquid from a conveyed product comprises a modular conveyor belt designed to follow a path that includes both substantially straight or curved portions and helical portions. The modular conveyor belt includes side walls to facilitate formation of the helical portions and openings to allow liquid to escape. In the helical portions, a centrifugal force imparted on conveyed product forces water through openings in the conveyor belt to dewater the product.

According to one aspect, a dewatering system, comprising a frame having an input and an output and a conveyor belt housed in the frame. The conveyor belt forms a circuit in the frame that includes a substantially straight portion and a helical portion for dewatering a product conveyed on the conveyor belt.

According to another aspect, a conveyor belt module forms a dewatering conveyor capable of forming a circuit that comprises a straight portion and a helical portion. The conveyor belt module comprises a base portion having a bottom wall, a first side wall extending up from the bottom wall along a first side edge, a second side wall extending up from the bottom wall along a second side edge, a first set of hinge elements extending from a front edge of the bottom wall and a second set of hinge elements extending from a rear edge of the bottom wall and a basket portion seated in the base portion. The basket portion includes a perforated bottom wall, a first side wall extending up from the perforated bottom wall at a first side and a second side wall extending up from the perforated bottom wall at a second side.

According to another aspect, a conveyor belt suitable for removing water from a conveyed product comprises a plurality of hingedly connected modules each module including tapering side walls and a plurality of hinge rods connecting the hingedly connected modules. The conveyor belt includes a straight portion in which the hingedly connected modules are straight relative to each other and a helical portion in which the modules shift laterally relative to each other and curl up about their hinge rod to form a helix.

According to another aspect, a method of removing liquid from a conveyed product comprises the steps of conveying product to a dewatering system comprising a frame, a dewatering conveyor belt and a rotating drum, about which a portion of the dewatering conveyor belt wraps, transferring the conveyed product onto a straight portion of the dewatering conveyor belt and subjecting the conveyed product to a centrifugal force, causing water to pass out of the conveyor belt while retaining the conveyed product on the conveyor belt to form a dewatered product.

BRIEF DESCRIPTION OF THE DRAWINGS

These features and aspects of the invention, as well as its advantages, are better understood by referring to the following description, appended claims, and accompanying drawings, in which:

DETAILED DESCRIPTION OF THE INVENTION

A conveyor system capable of dewatering conveyed product via centrifuge comprises a modular conveyor belt designed to follow a path that includes substantially straight portions and helical portions. Embodiments of the invention will be described below relative to certain illustrative embodiments, though the invention is not limited to those embodiments.

Figure 1:
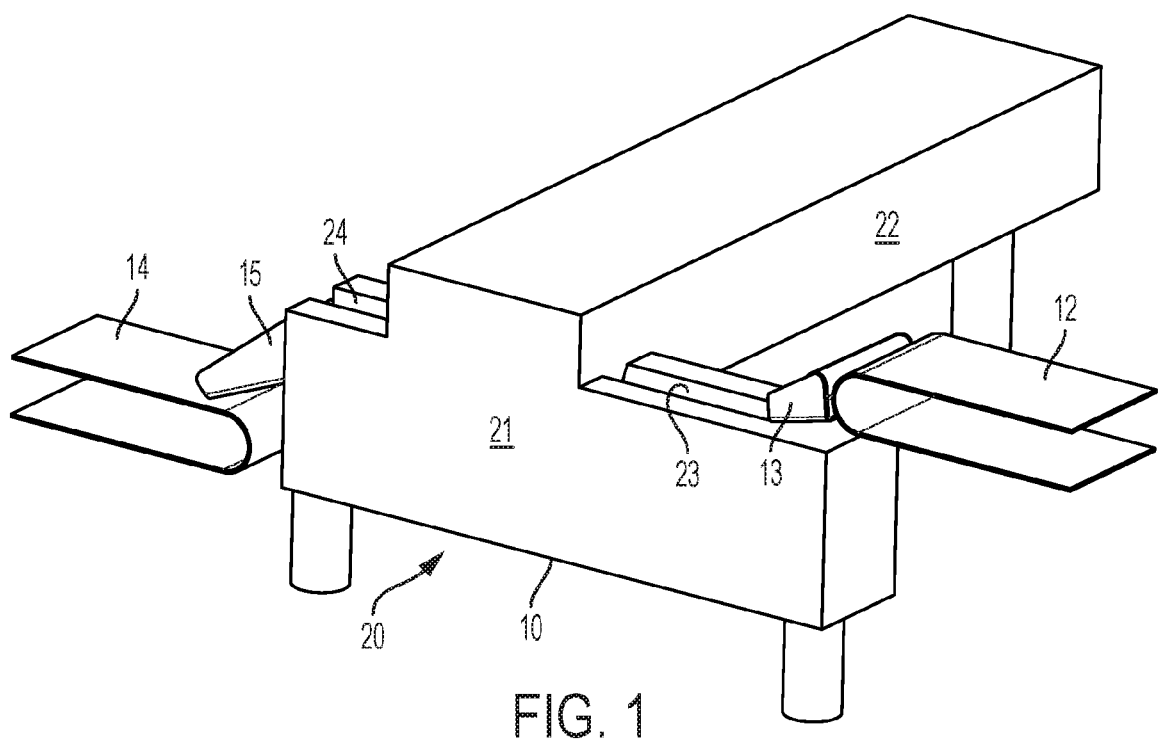
FIG. 1 is an isometric view of a centrifugal conveyor system suitable for removing liquid from a conveyed product.

FIG. 1 shows a centrifugal conveyor system 10 which may be used to remove liquid, such as water, from a conveyed product. The centrifugal conveyor system 10 includes an input conveyor 12, a frame 20 including a transfer portion 21 and a centrifuging portion 22. The input conveyor delivers product to be dewatered into an input trough 23 via a chute 13. Then, the product passes to the centrifuging portion 22, which imparts a centrifugal force on the conveyed product to remove water and-or other liquid from the product. The dried product then passes into an output trough 24 in the transfer portion 21, which passes the dried product to an output conveyor 14 via another chute 15. The frame 20 can include a trough, channel or other device for collecting the removed water in the centrifuging portion and discharging it from the system.

Figure 2:
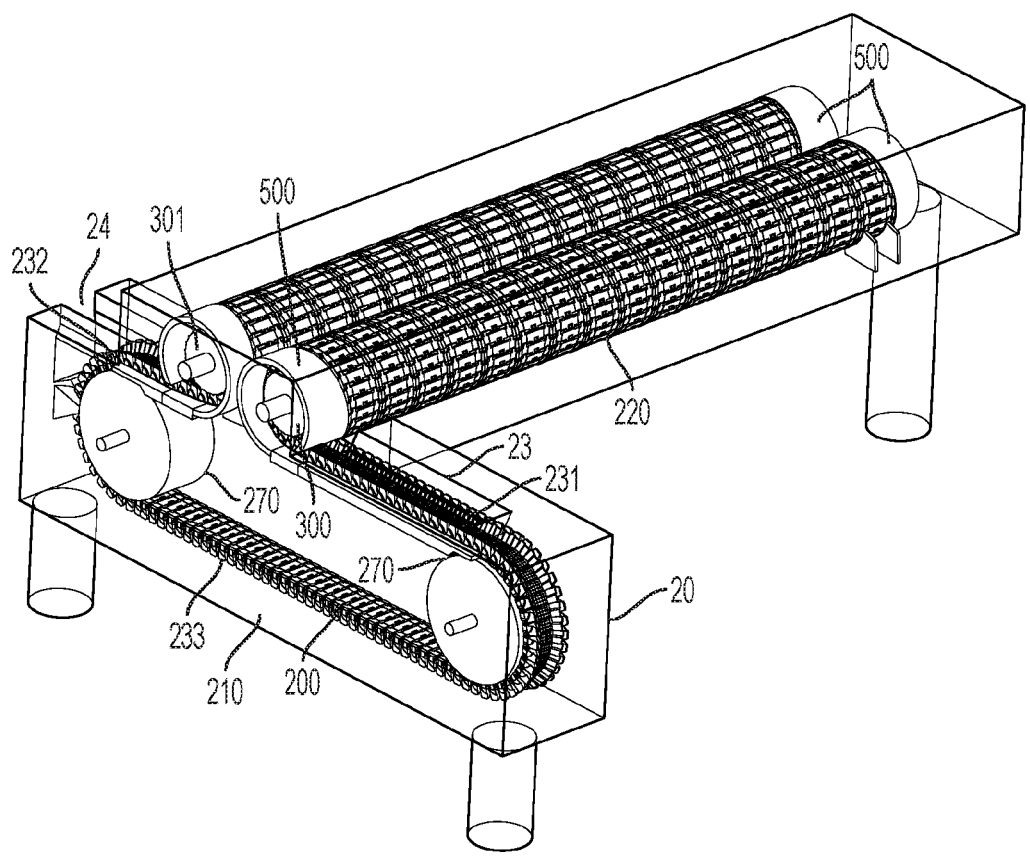
FIG. 2 is a detailed view of the interior of the centrifugal conveyor system of FIG. 1.

FIG. 2 shows the conveying system within the frame 20 for receiving product, dewatering the product by applying centrifugal force to the product, and delivering the dewatered product to an output. A conveyor belt 200 forming a circuit within the frame 20 comprises a dewatering portion 220 within the centrifuging portion of the frame and a transfer portion 210 within the transfer portion of the frame. In the transfer portion 210, the conveyor belt is trained around sprockets, drums or other suitable guide structure 270 to form a first straight portion 231 below the input trough 23 and a second straight portion 232 below the output trough 24. Between the input trough and output trough, the conveyor belt 200 transitions to form a two parallel helixes to enable dewatering of conveyed product via centrifuge. In this dewatering portion, the conveyor belt wraps around a first drum 300, then returns to the transfer portion by wrapping around a second drum 301 parallel to the first drum, before transitioning to the second straight portion 232 and returning via a lower returnway 233. The conveyor belt 200 includes side walls, the top edges of which engage the rotating drums 300, 301. The drums 300, 301 rotate to advance the conveyor belt axially along the drum on a helical path, imparting a centrifugal force that drains the product of water, which escapes the conveyor belt via openings, as described below. The conveyor belt 200 is driven helically about the rotating drums at a high rate of speed to spin the water off the outside of the conveyed product. The conveyor belt is capable of shifting laterally to negotiate the helical path and the return, as described below. Guides 500 form a seal at the transition points to keep product on the conveyor belt 200 and help transition the conveyor belt 200 between the straight portions and the helical portions.

Figure 3:
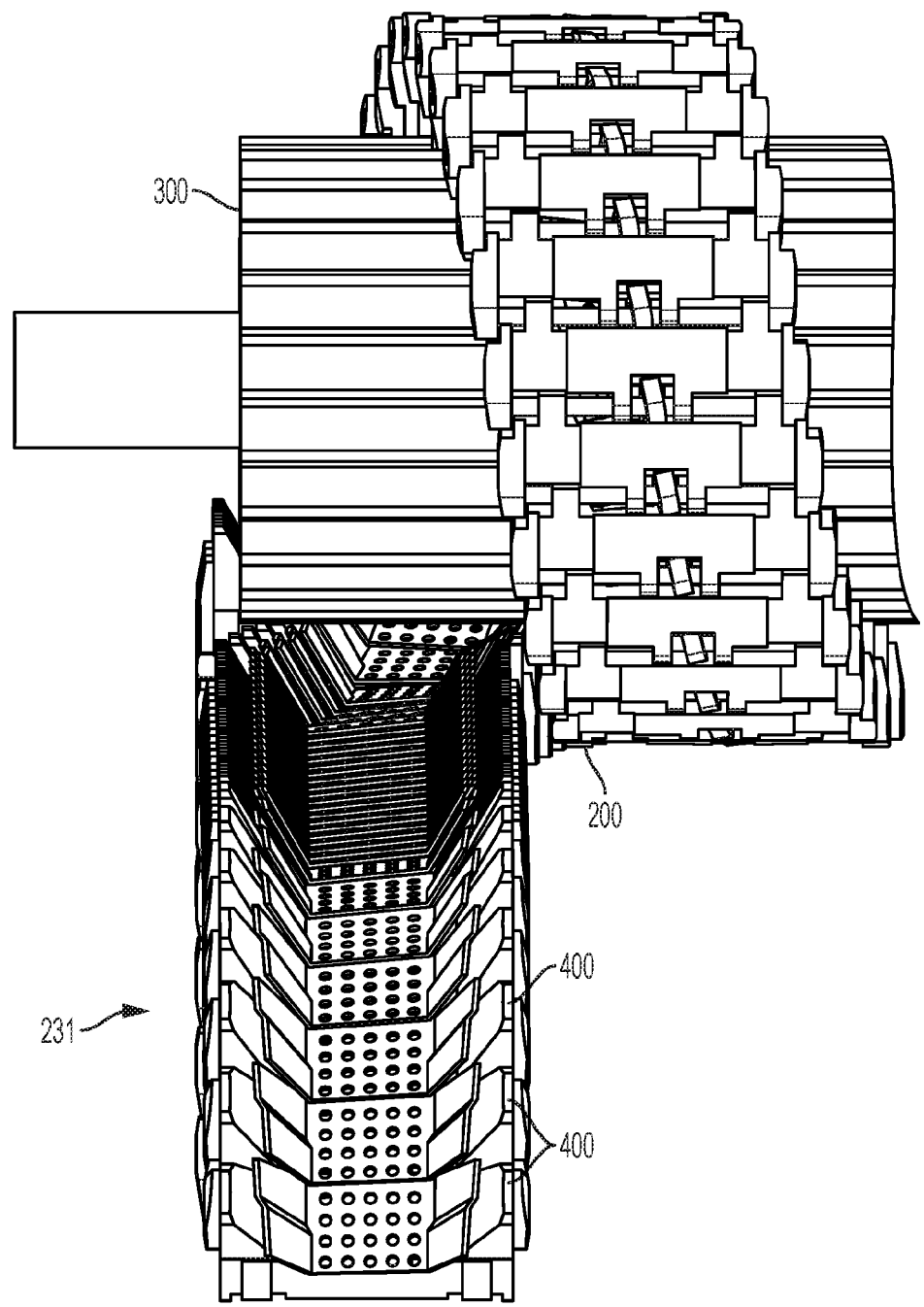
FIG. 3 is a detailed view of the conveyor belt of the centrifugal conveyor system as it transitions from a straight portion to a helical portion.

FIG. 3 is a detailed view the transition between the inlet straight portion 231 and the dewatering portion, where the conveyor belt moves onto the drum 300 and begins to form a helix. The conveyor belt 200 is a modular conveyor belt with multiple degrees of freedom between modules 400 to allow the formation of helical portions and substantially straight running portions. As shown, the modules 400 are able to both shift laterally relative to each other, and curl up, rotating about the hinge rods used to connect successive modules, to form the helix. In the illustrative helix, side walls of each tier abut each other, but the invention is not so limited. The modules 400 can comprise injection-molded plastic or another suitable material or combination or materials.

Figure 4:
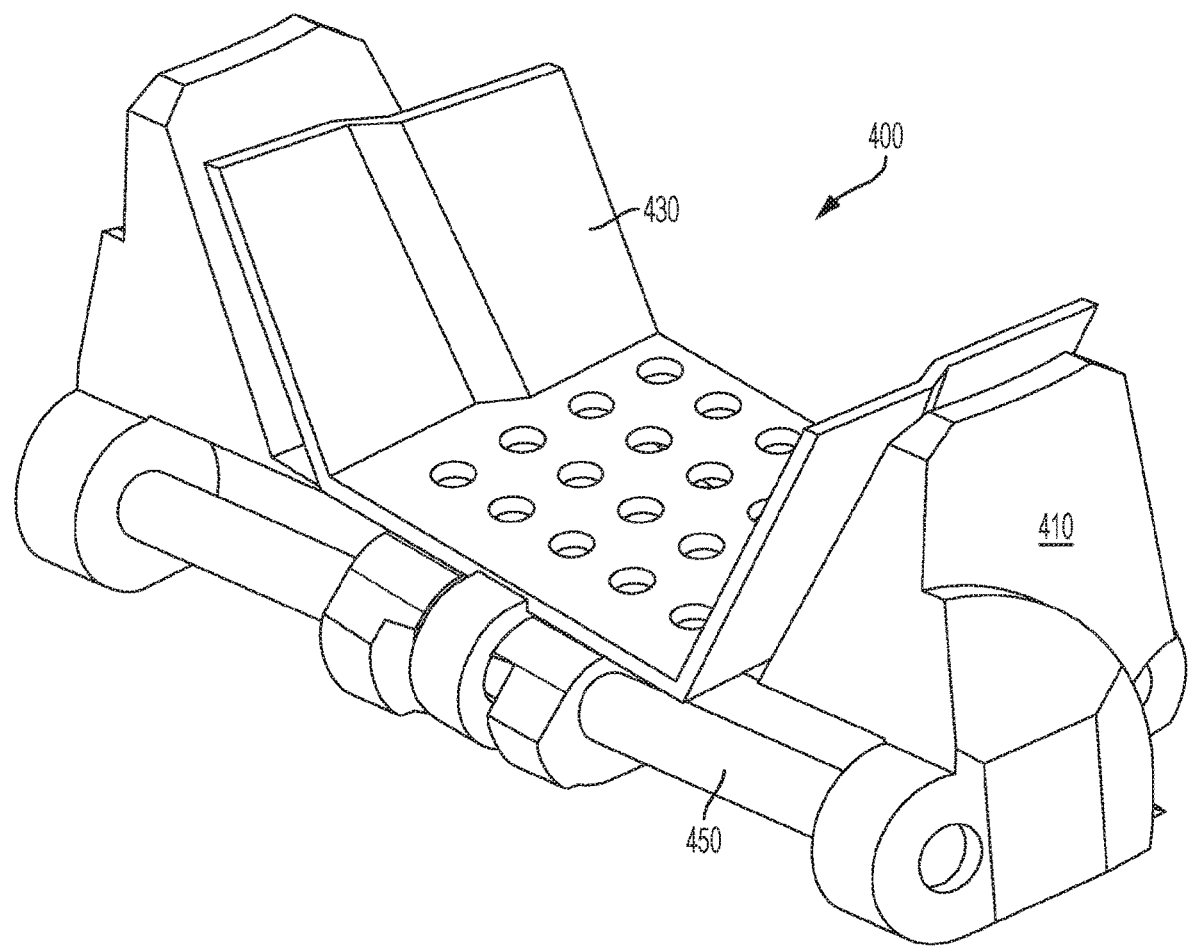
FIG. 4 is an isometric view of a module suitable for forming a centrifuging conveyor belt according to an embodiment of the invention.

FIG. 4 shows a conveyor belt module 400 suitable for forming a dewatering conveyor belt 200 capable of following a path that includes straight portions and helical portions for imparting a centrifugal force on a conveyed product. The module 400 comprises a base portion 410, a basket 430 seated in the base portion and a hinge rod 450 for connecting the module to another module to form a chain. The hinge rod 450 also connects the basket 430 to the base portion 410.

Figure 5:
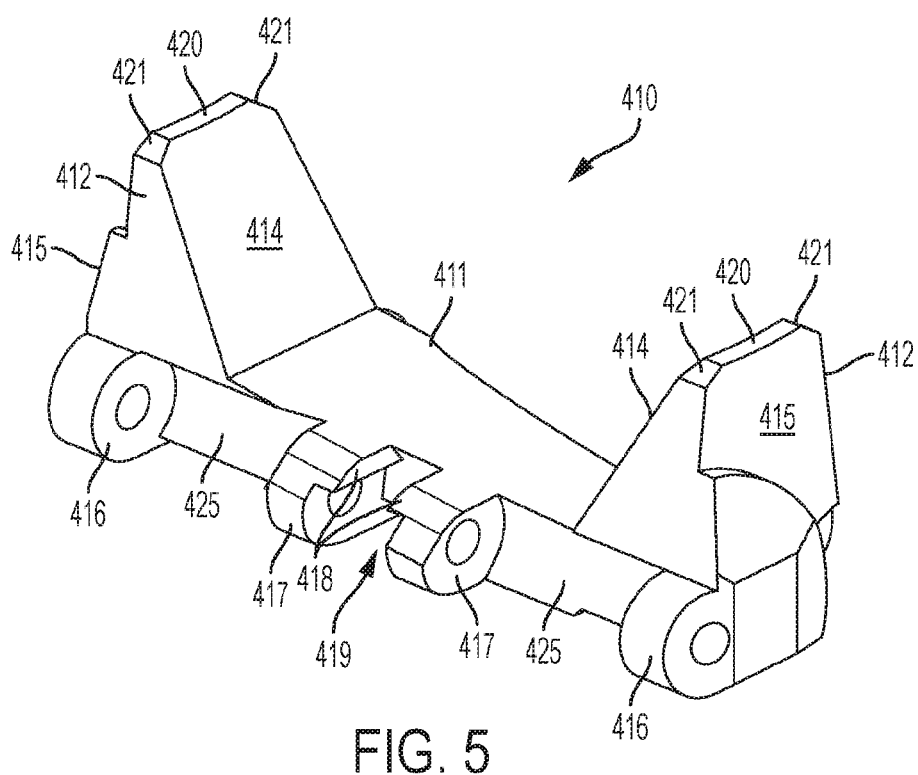
FIG. 5 shows the base portion of the module of FIG. 4.

Referring to FIG. 5, the illustrative base portion 410 comprises a bottom wall 411, side walls 412 having sloped inner surfaces 414 and shaped outer surfaces 415, and a connecting portion. The connecting portion comprises hinge elements extending down and out from the front and rear edges of the bottom wall 411. The front hinge elements comprise two outer hinge elements 416 extending from and below the side walls 412 and two inner hinge elements 417. The inner hinge elements 417 include an overhang 418 extending into the space 419 between the front inner hinge elements. The rear hinge elements (not shown) are configured to fit into gaps 425 between the outer and inner hinge elements of an adjacent module. The rear hinge elements are smaller than the gaps 425 to enable lateral shifting of modules relative to each other. The shaped outer surfaces 415 have an arc-shaped protrusion with a square flat surface behind the outer hinge element 416. The top edge of each side walls 412 includes a central portion 420 that may be slightly convex or flat and side bevels 421. In the helical portion, the central portion 420 is designed to engage the outer surface of the drum 300 or 301. The front and rear edges of the side walls 412 are angled so that the side walls 412 slightly taper towards the top edge, enabling the formation of the helical portion of the conveyor belt. As shown, the side walls 412 also taper in thickness in the lateral direction, between the inner surface 414 and outer surface 415.

Figure 6:
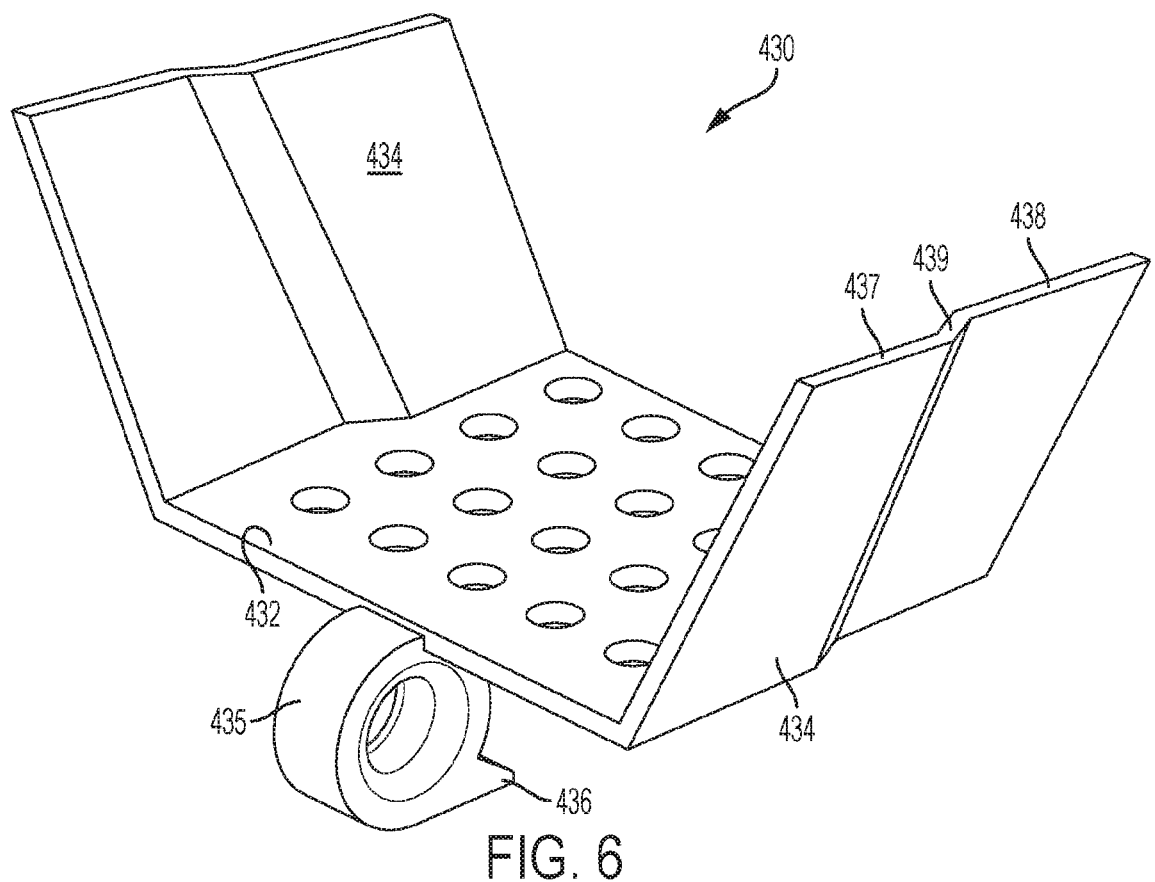
FIG. 6 shows the basket portion of the module of FIG. 4.

Referring to FIG. 6, the basket 430 is configured to sit in the base portion and hold conveyed product. The basket 430 comprises a perforated bottom wall 432 and sloped side walls 434, forming a compartment that tapers in width from the open top to the bottom wall 432. The perforated bottom wall 432 has openings sized and configured to retain a conveyed product while allowing water to pass therethrough. The bottom wall of the basket can have any suitable size, shape and configuration for filtering water from a conveyed product. The side walls 434 comprise staggered portions 437, 438 connected by a middle angled portion 439, though the invention is not so limited. The basket 430 further includes a hinge portion 435 extending down from the front edge of the bottom wall 432. The illustrative hinge portion 435 is laterally centered and includes a protrusion 436 forming a stopper. When seated in the base portion 410, the hinge portion 435 aligns with the hinges 416, 417 on the base portion to form a hinge passageway for the hinge rod 450. The hinge rod 450 is inserted in the hinge passageway to connect the basket 430 to the base portion 410. The overhang 418 in the hinge elements 417 allows for lateral movement and rotation of the basket 430 within the base portion. As shown in FIG. 4, the side walls 434 of the basket 430 extend longitudinally (in the direction of belt travel) beyond the side walls 412 of the base portion 410 when the module 400 is assembled.

Figure 7:
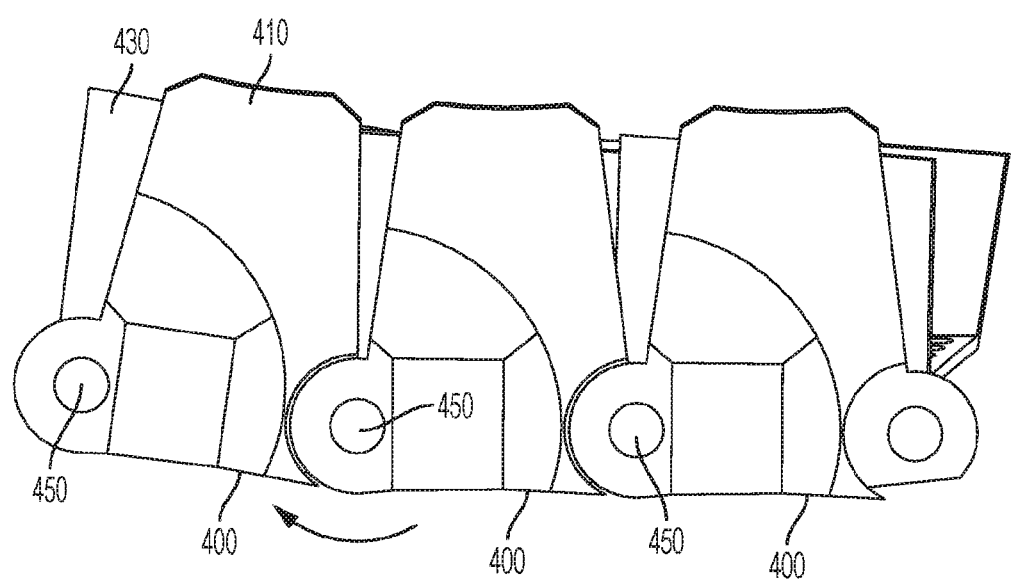
FIG. 7 is a side view of a plurality of hingedly connected modules of an embodiment of the invention.
Figure 8:
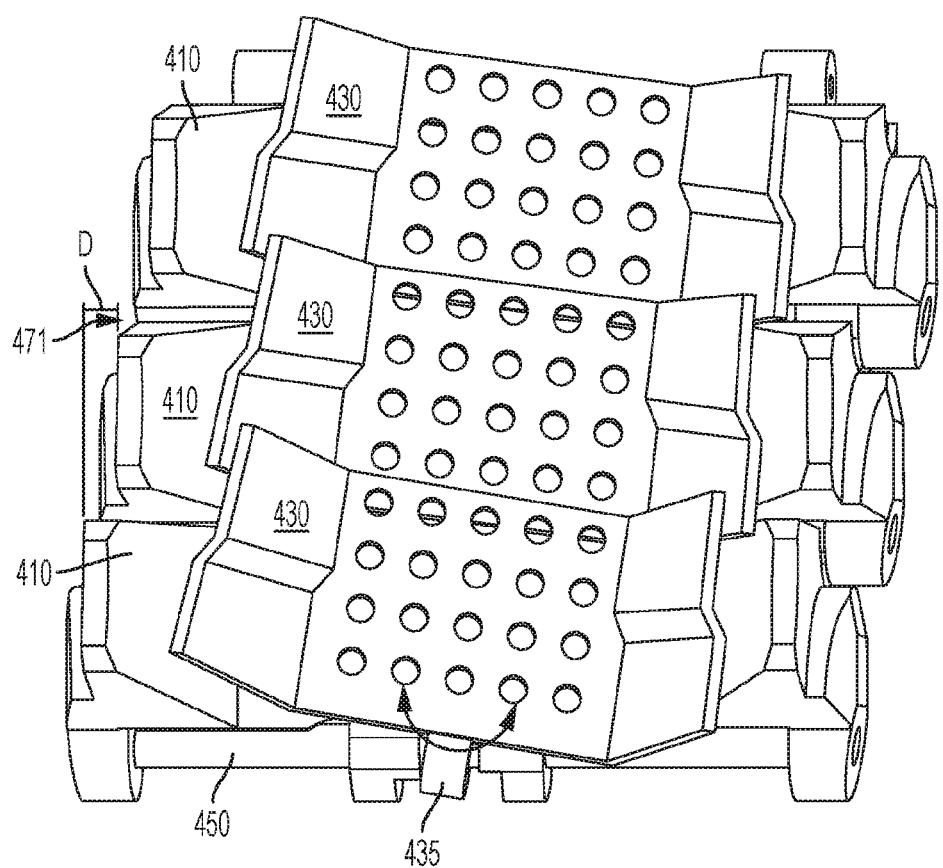
FIG. 8 is a top view of a plurality of hingedly connected modules of an embodiment of the invention.
Figure 9:
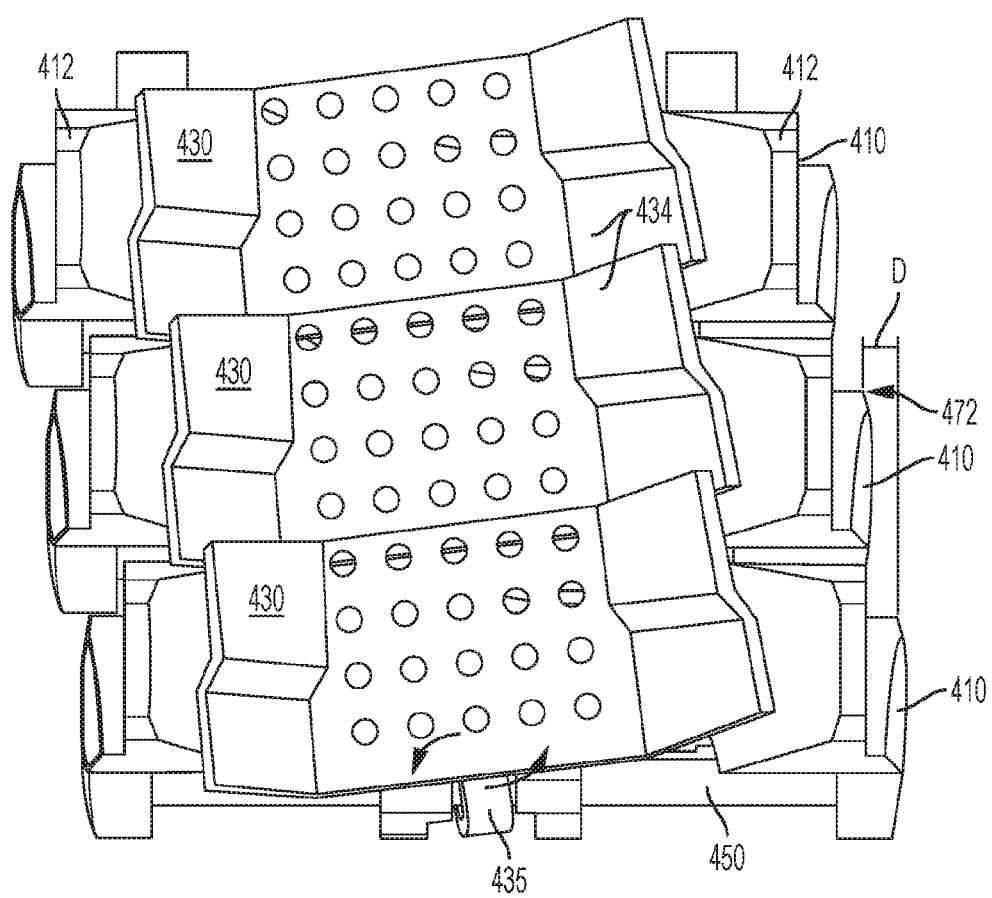
FIG. 9 is a top view of a plurality of hingedly connected modules laterally shifted in a second direction.
Figure 10:
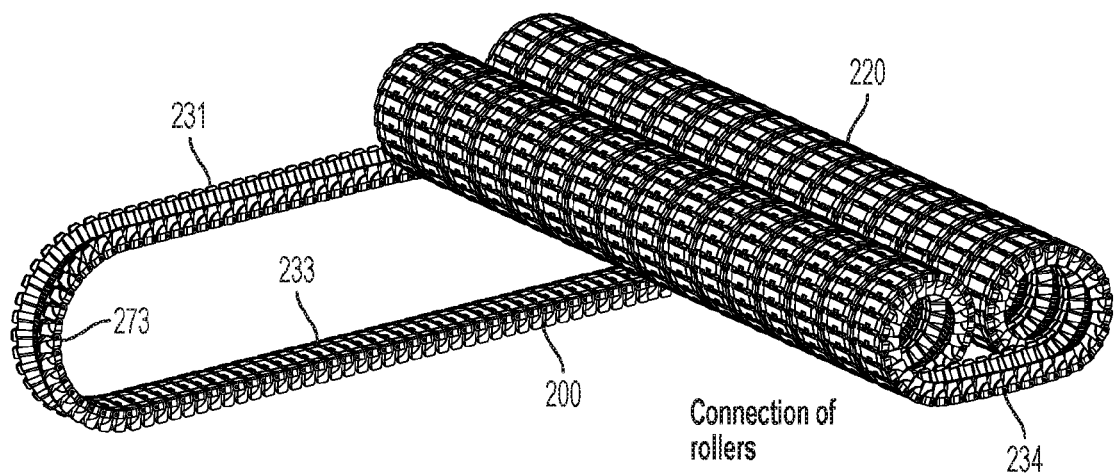
FIG. 10 is an isometric view of the conveyor belt of FIG. 2.
Figure 11:
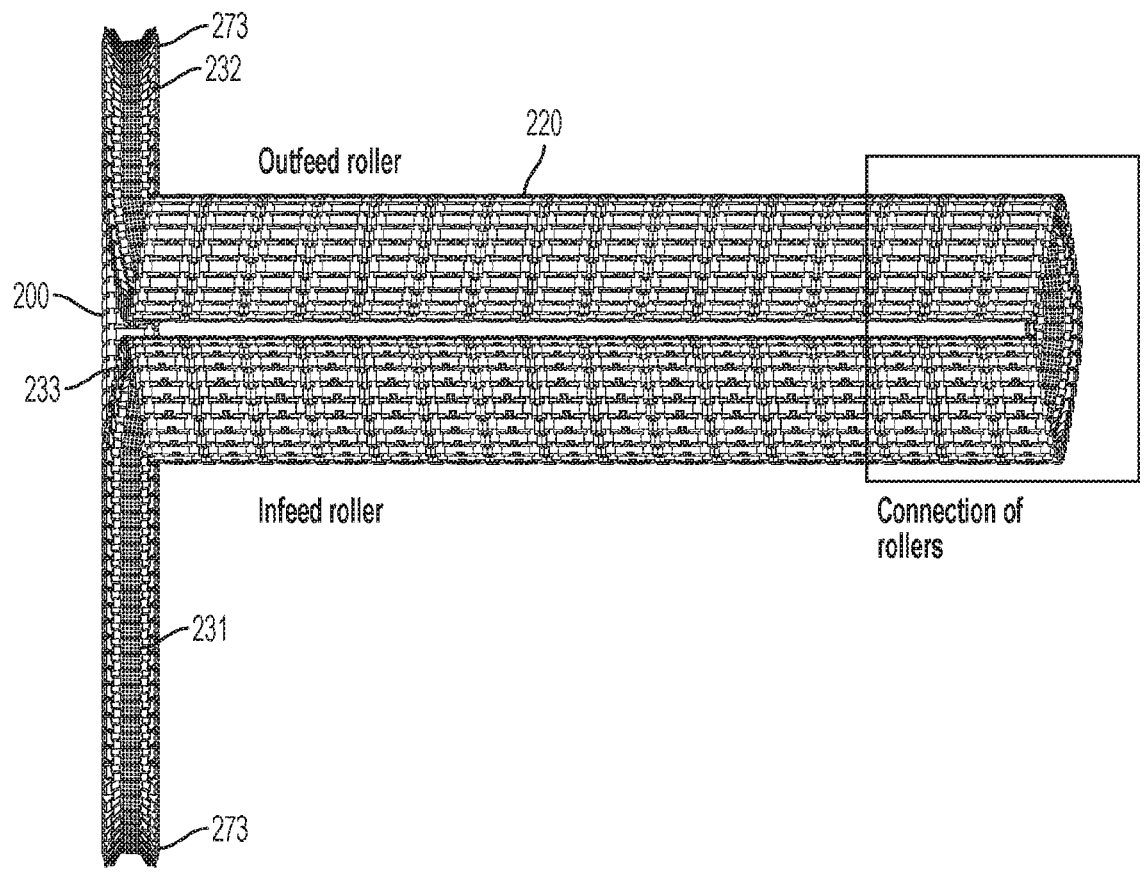
FIG. 11 is a top view of the conveyor belt of FIG. 2.
Figure 12:
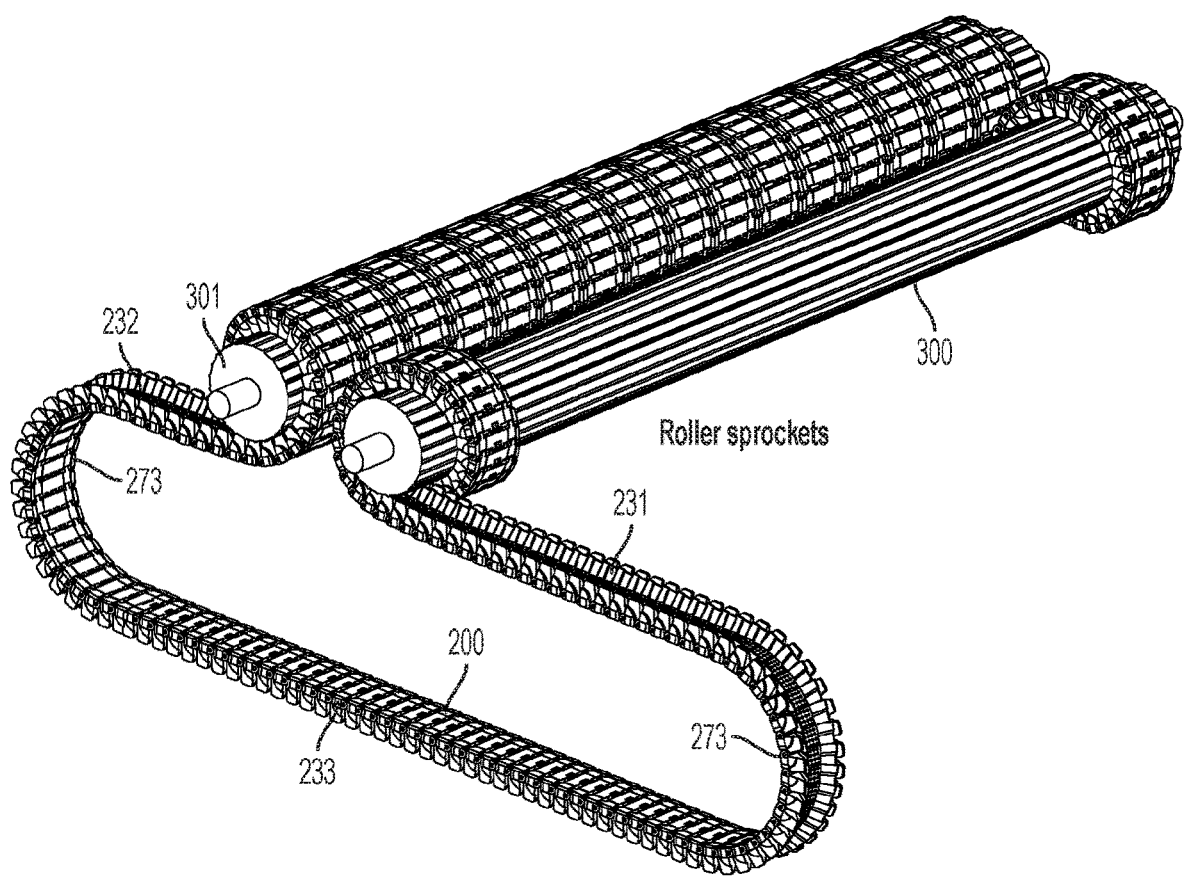
FIG. 12 is an isometric view of a portion of the conveyor belt and the drums in the system of FIG. 2.

As shown in FIG. 7, the illustrative configuration allows bending of the modules 400 about the hinge pin 450 when assembled, so the conveyor belt can "curl up." In addition, the baskets 430 can rotate in two directions about the hinge 450 with respect to the base portions 410, as shown in FIGS. 8 and 9. As also shown in FIGS. 8 and 9, successive modules 400 can shift laterally relative to each other by a select distance D in a first direction 471 or a second direction 472. The hinge elements on the rear side of the modules can slide along the hinge rod to allow the lateral shifting. The staggered side walls 434 of the basket allow overlapping between baskets to enable lateral shifting, rotating and curling. The multiple degrees of freedom of the modules 400 in the conveyor belt 200 enable the belt to form the helical configuration in dewatering portion 220, straight portions in sections 231, 232, 233 and 234 and as well as curve around guide structure 270 in reversing portions 273, as shown in FIGS. 10, 11 and 12.

In the illustrative embodiments, the outer surfaces 415 of the base side walls 412 in successive tiers of the helix abut each other, with the top edges 420 abutting and engaging the drum outer surface to form a helical chamber between the drum 300, 301, side walls 412 and basket bottom walls 432. Driving the drum causes the conveyor belt 200 to advance along the helical path, imparting a centrifugal force on the product, pushing the product against the basket bottom wall 432. Water passes through the openings in the perforated bottom wall, while the product is retained in the chamber.

At the end of the first drum 300, the conveyor belt transitions off the first drum 300 into a short straight portion 234 curling up and shifting laterally to form the second helix on the second drum 301.

Figure 13:
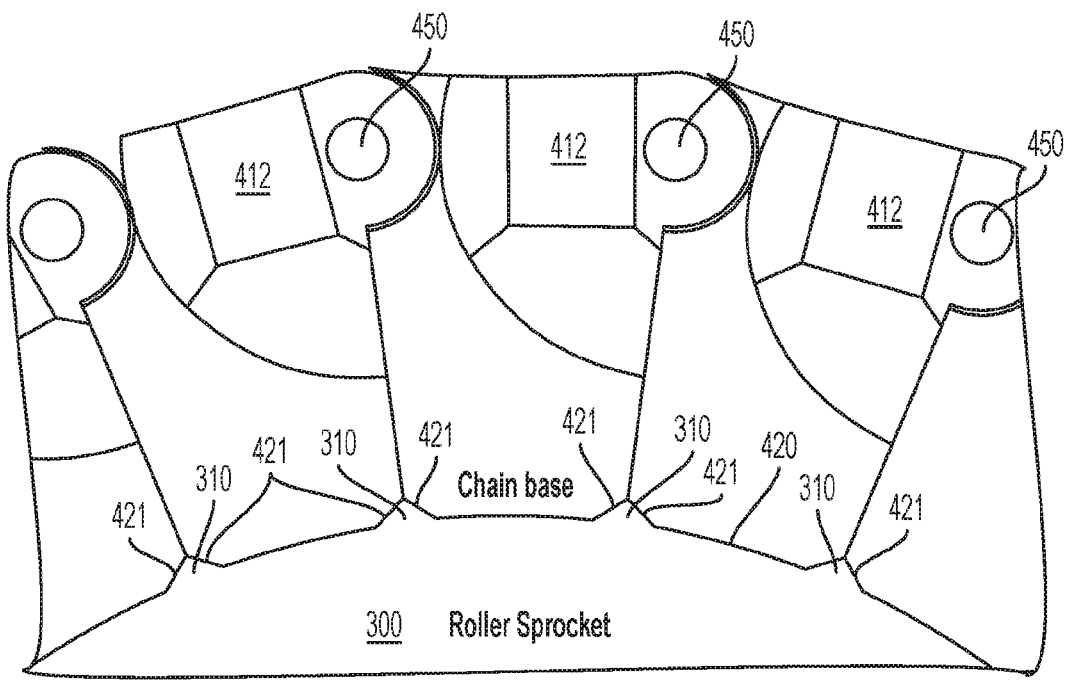
FIG. 13 is a detailed side view of the conveyor belt-drum interface according to an embodiment of the invention.
Figure 14:
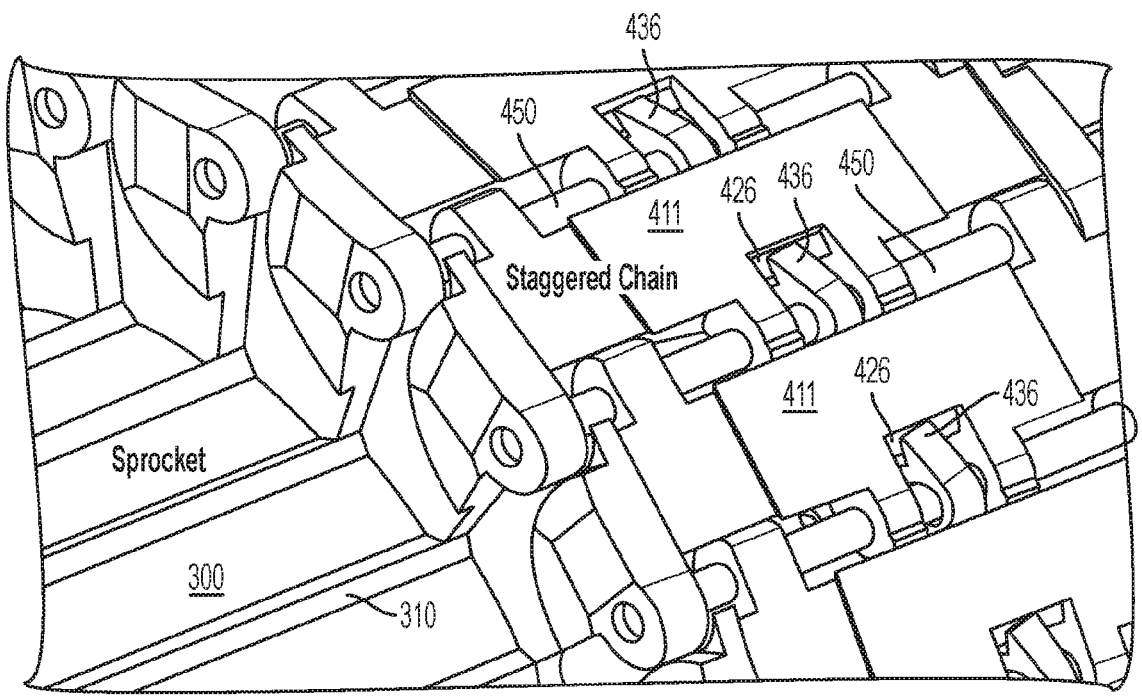
FIG. 14 is a detailed isometric view of the conveyor belt-drum interface of FIG. 13.

The conveyor belt 200 can be drive through any suitable means. For example, referring to FIGS. 12-14, the illustrative drums 300, 301 include teeth 310 that positively engage a feature on the conveyor belt 200 to drive the conveyor belt through its circuit. In the illustrative embodiment, a drive pocket for engaging the teeth is formed between the side bevels 421 of successive modules, as shown in FIGS. 13 and 14. When the conveyor belt curls about the hinge rods 450 to form the helical shape, the side walls 412 of successive modules are brought together, leaving a pocket formed by the side bevels 421 that is configured to engage the teeth 310, with the top edge portion 420 abutting the outer surface of the drum 300.

The invention is not limited to the illustrative driving means. The conveyor belt can be driven through friction or another positive drive system. FIG. 14 also shows the stop 436 of the basket 430 engaging a surface 426 on the base portion to limit the backbend of the conveyor belt.

Figure 15:
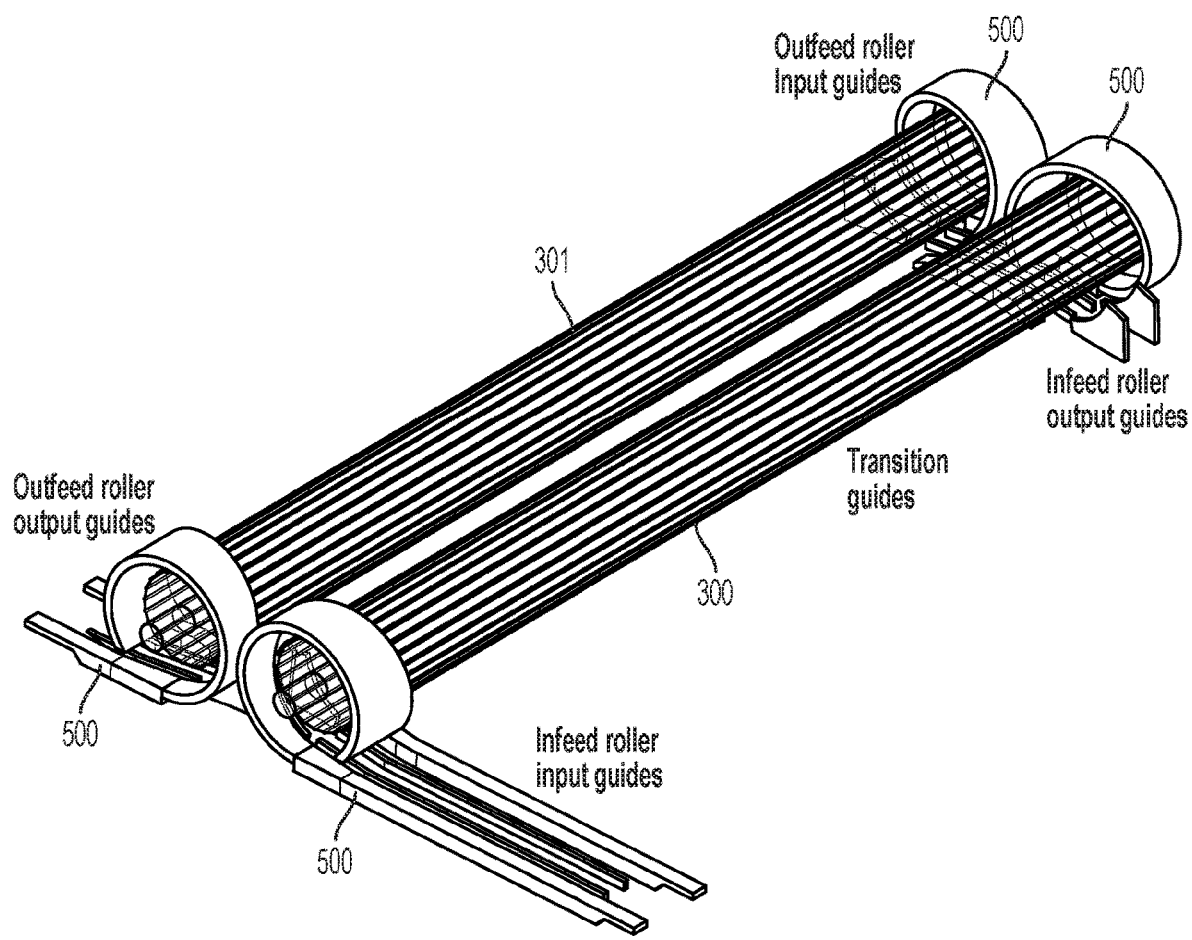
FIG. 15 is an isometric view of the drums and guides in the system of FIG. 2.

FIG. 15 shows the guides 500 used to help transition the conveyor belt 200 onto and off of the drums 300, 301 and help keep product on the conveying path according to an illustrative embodiment. The guides 500 each include an annular cap at the transition between a straight portion and a helical portion of the conveyor belt 200. The guides 500 further include side rails that extend along a straight portion of the conveyor belt 200.

Although the invention has been described in detail with reference to a few exemplary versions, other versions are possible. The scope of the claims is not meant to be limited to the versions described in detail.

What is claimed is:

1. A dewatering system, comprising:
    a frame having an input and an output;
    a conveyor belt having side walls housed in the frame, the conveyor belt forming a circuit in the frame that includes a substantially straight portion and a helical portion for dewatering a product conveyed on the conveyor belt; and
    a first drum rotatably mounted within the frame,
    wherein the conveyor belt wraps around the first drum, with the side walls engaging an outer surface of the first drum, to form a first portion of the helical portion.

2. The dewatering system of claim 1, further comprising a second drum parallel to the first drum in the frame, about which the conveyor belt wraps to form a second portion of the helical portion.

3. The dewatering system of claim 2, wherein the first drum and second drum include teeth for driving the conveyor belt.

4. The dewatering system of claim 1, wherein the conveyor belt is a modular plastic conveyor belt comprising a plurality of hingedly connected modules, each of the plurality of modules capable of shifting laterally relative to an adjacent module of the plurality of modules and curling upwards about a hinge rod to form the helical portion.

5. The dewatering system of claim 4, wherein each of the plurality of modules comprises a base portion having side walls and hinge elements and a basket portion seated in the base portion comprising a perforated bottom wall, staggered side walls and a hinge element for connecting the basket portion to the base portion via a hinge rod.

6. A conveyor belt module for forming a dewatering conveyor capable of forming a circuit that comprises a straight portion and a helical portion, the conveyor belt module comprising:
    a base portion having a bottom wall, a first side wall extending up from the bottom wall along a first side edge, a second side wall extending up from the bottom wall along a second side edge, a first set of hinge elements extending from a front edge of the bottom wall and a second set of hinge elements extending from a rear edge of the bottom wall; and
    a basket portion seated in the base portion, the basket portion including a perforated bottom wall, a first side wall extending up from the perforated bottom wall at a first side and a second side wall extending up from the perforated bottom wall at a second side.

7. The conveyor belt module of claim 6, wherein the side walls of the basket portion comprise staggered portions separated by a middle angled portion.

8. The conveyor belt module of claim 6, wherein the side walls of the basket portion are longer in a longitudinal direction than the side walls of the base portion.

9. The conveyor belt module of claim 6, wherein the basket portion includes a hinge element extending from the perforated bottom wall, the hinge element of the basket portion inserted between and aligned with two central hinge elements in the first set of hinge elements on the base portion.

10. The conveyor belt module of claim 9, wherein the central hinge elements each include an overhanging portion to enable rotation of the basket portion about the hinge element within the base portion.

11. The conveyor belt module of claim 6, wherein the first set of hinge elements on the base portion comprises two central hinge elements and two outer hinge elements, with each of the outer hinge elements separated from one of the central hinge element by a gap, and the second set of hinge elements comprises two hinge elements, each of the hinge elements in the second set opposite and smaller in width than a gap on the front edge to enable lateral shifting of successive conveyor belt modules in the conveyor belt relative to each other.

12. The conveyor belt module of claim 6, wherein the side walls of the base portion include a top edge having a central concave portion and two side bevels.

13. A conveyor belt suitable for removing water from a conveyed product, comprising:
    a plurality of hingedly connected modules, each of the plurality of modules including a base portion having tapering side walls and a basket seated in the base portion comprising a perforated bottom wall and staggered side walls; and
    a plurality of hinge rods connecting the hingedly connected modules, each of the plurality of hinge rods also connecting a basket to a base portion via hinge elements,
    wherein the conveyor belt includes a straight portion in which the hingedly connected modules are straight relative to each other and a helical portion in which the modules shift laterally relative to each other and curl up about their hinge rod to form a helix.

14. A method of removing liquid from a conveyed product, comprising the steps of:

conveying product to a dewatering system comprising a frame, a dewatering conveyor belt and a rotating drum, about which a portion of the dewatering conveyor belt wraps;

transferring the conveyed product onto a straight portion of the dewatering conveyor belt; and subjecting the conveyed product to a centrifugal force, causing water to pass out of the conveyor belt while retaining the conveyed product on the conveyor belt to form a dewatered product.

15. The method of claim 14, further comprising the step of transferring the dewatered product to an outlet conveyor.

\* \* \* \* \*